United States Patent [19]
Tarr

[11] Patent Number: 5,968,309
[45] Date of Patent: Oct. 19, 1999

[54] METHOD FOR TRANSFORMING A THERMOPLASTIC NOVELTY TOOTHBRUSH INTO A COSTUME JEWELRY PIECE OR TOY

[75] Inventor: Daniel Edward Tarr, Tulsa, Okla.

[73] Assignee: D. Jet Enterprises, L.L.C., Tulsa, Okla.

[21] Appl. No.: 09/097,689

[22] Filed: Jun. 16, 1998

[51] Int. Cl.[6] .......................... B29C 53/02; B29C 53/84; B29C 71/02
[52] U.S. Cl. .................... 156/344; 15/143.1; 15/167.1; 63/1.12; 264/138; 264/237; 264/295; 264/322; 264/339; 264/348; 264/DIG. 55; 425/DIG. 57
[58] Field of Search .................... 63/1.12; 15/167.1, 15/143.1; D11/3, 4, 5; D4/104; 264/294, 295, 339, 237, 322, 348, DIG. 55, 138; 425/DIG. 57; 156/344

[56] References Cited

U.S. PATENT DOCUMENTS

| | | | |
|---|---|---|---|
| D. 287,072 | 12/1986 | Pfleger | D4/104 |
| D. 299,386 | 1/1989 | Jacobs | D4/104 |
| D. 389,312 | 1/1998 | Porter | D4/104 |
| 1,470,710 | 10/1923 | Davis | 15/167.1 |
| 2,377,042 | 5/1945 | Rosenthal | 41/10 |
| 2,385,588 | 9/1945 | Schneider | 223/88 |
| 2,390,567 | 12/1945 | Williams | 18/56 |
| 3,352,960 | 11/1967 | McLaughlin | 264/322 |
| 3,798,698 | 3/1974 | Conklin, Jr. | 15/167.1 |
| 4,401,616 | 8/1983 | Wagner | 264/138 |
| 4,829,621 | 5/1989 | Phenegar | 15/172 |
| 5,155,878 | 10/1992 | Dellis | 16/111 |
| 5,187,829 | 2/1993 | Atkins | 15/167.1 |
| 5,191,671 | 3/1993 | Rudnick | 15/167.1 |
| 5,323,504 | 6/1994 | McCusker | 15/167.1 |
| 5,353,464 | 10/1994 | Atkins et al. | 15/167.1 |
| 5,354,533 | 10/1994 | Antoine | 264/296 |

*Primary Examiner*—Jan H. Silbaugh
*Assistant Examiner*—Michael Poe
*Attorney, Agent, or Firm*—Head, Johnson & Kachigian

[57] ABSTRACT

A method to transform a thermoplastic novelty toothbrush into a costume jewelry piece, such as a bracelet, or a toy after it is no longer employed in service as a toothbrush. The thermoplastic material allows a user to easily remove the bristles and form the toothbrush into a costume jewelry piece or toy.

3 Claims, 2 Drawing Sheets

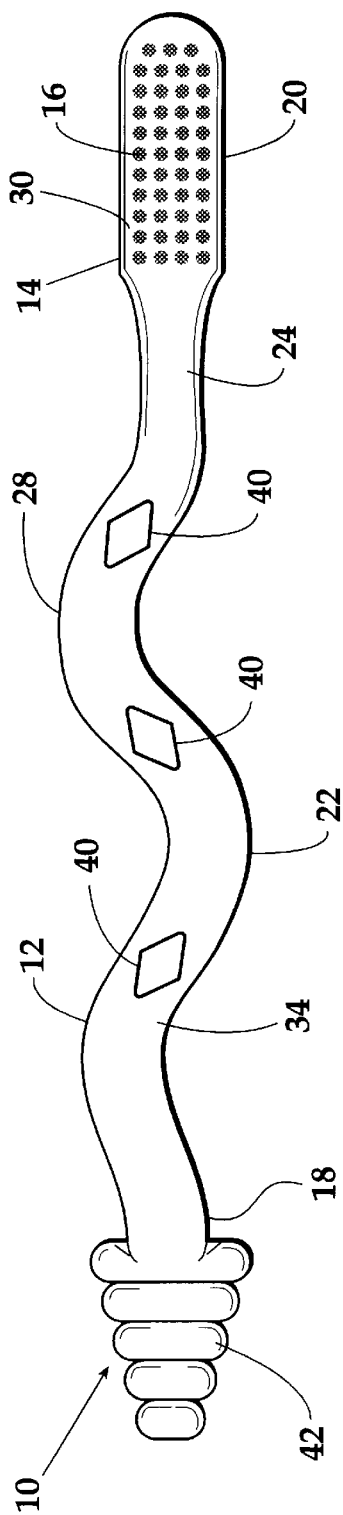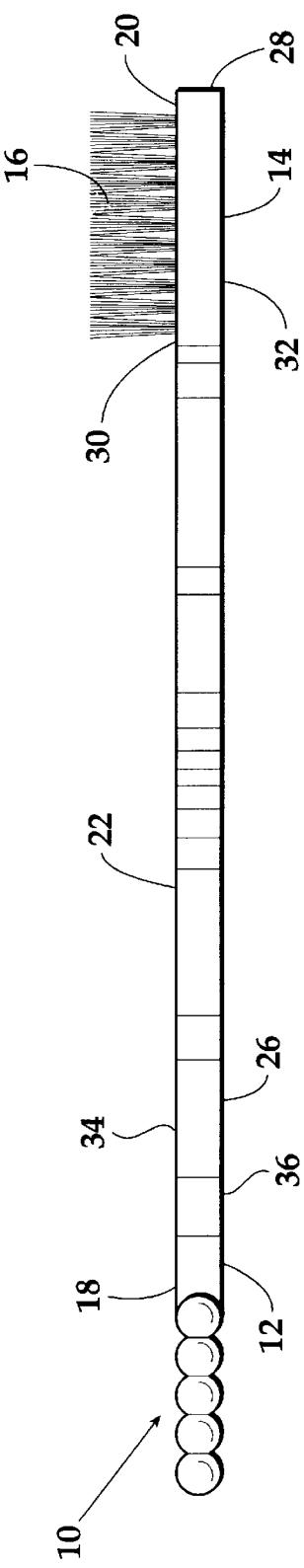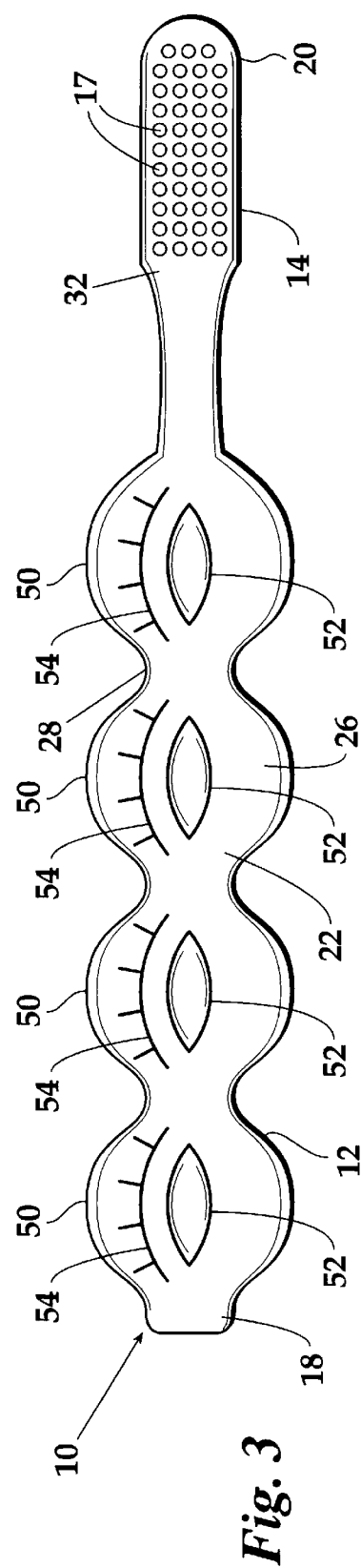

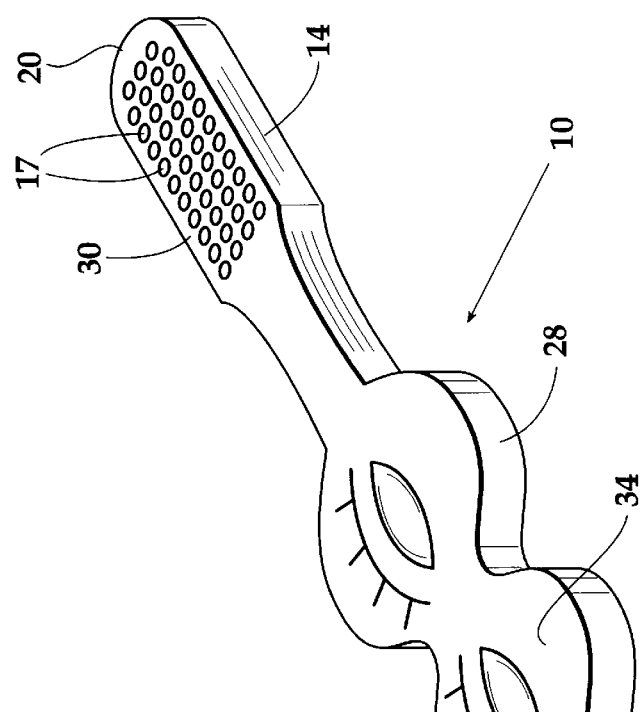
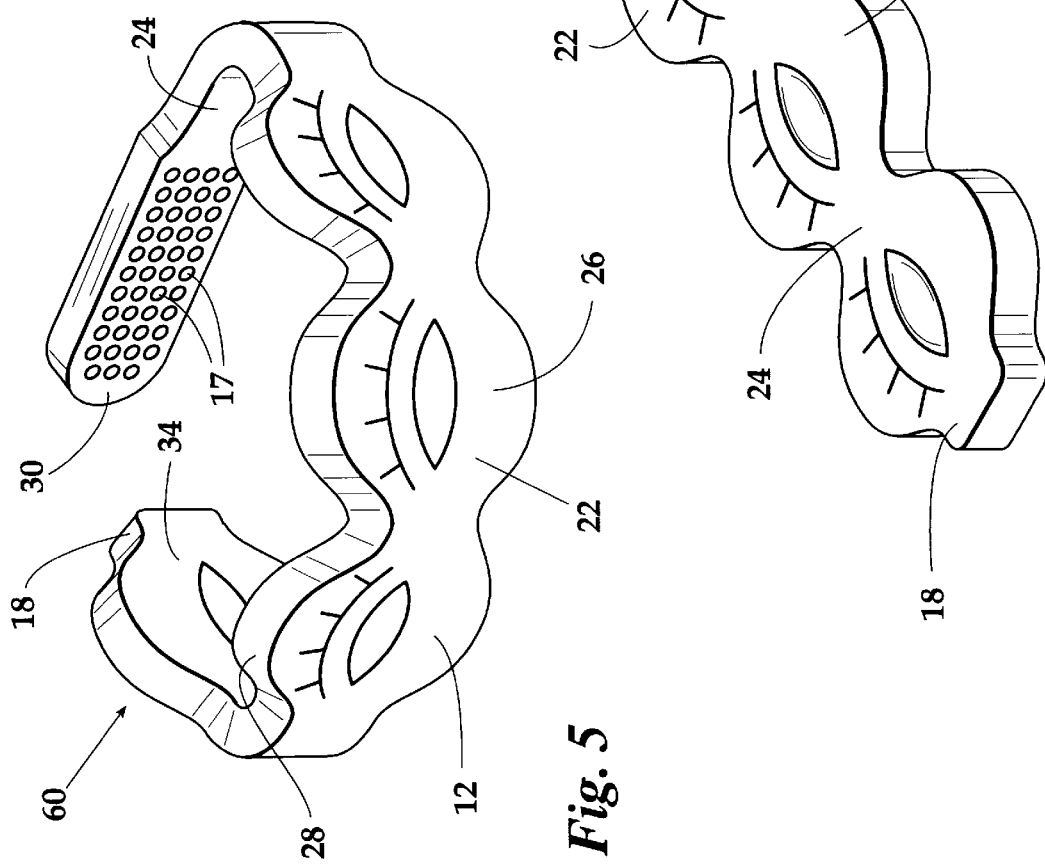

METHOD FOR TRANSFORMING A THERMOPLASTIC NOVELTY TOOTHBRUSH INTO A COSTUME JEWELRY PIECE OR TOY

CROSS-REFERENCE OF RELATED APPLICATION

Not applicable.

BACKGROUND OF THE INVENTION

1. Field of the Invention

The present invention relates to a thermoplastic toothbrush which may be transformed into a jewelry piece, such as a bracelet, or a toy after it is no longer employed in service as a toothbrush.

2. Description of the Related Art

The use of thermoplastics for forming objects has long been known. For example, Rosenthal (U.S. Pat. No. 2,377,042) discloses the use of thermoplastics to form decorative articles. McLaughlin (U.S. Pat. No. 3,352,960) discloses thermoplastic forming for the bending of plastic tubing. Wagner (U.S. Pat. No. 4,401,616) discloses thermoplastic forming for dental impression trays. Dellis (U.S. Pat. No. 5,155,878) discloses thermoplastic heat moldable hand grips for an individual's hands. Schneider (U.S. Pat. No. 2,385,588) discloses thermoformed clothes hangers. Antoine (U.S. Pat. No. 5,354,533) discloses a method for the hot deformation of a work piece.

In addition to forming thermoplastic objects using heat, Williams (U.S. Pat. No. 2,390,567) discloses the use of chemical baths for cold shaping of objects.

There have been many designs for toothbrushes having different handles, heads and bristles. For example, Pfleger (U.S. Pat. No. Des. 287,072) discloses a toothbrush with a wavy-shaped handle. Porter (U.S. Pat. No. Des. 389,312) discloses a toothbrush with a loop handle. Davis (U.S. Pat. No. 1,470,710) discloses a toothbrush with a loop handle which can be used as a tongue scraper. McCusker (U.S. Pat. No. 5,323,504) discloses a toothbrush which is non-resiliently deformable to change the angular relationship between the handle portion and head portion of the toothbrush.

It is also known that there is a current practice of plastically deforming ordinary toothbrushes into the shape of a bracelet by bending the toothbrush.

Although there have been many toothbrushes with different heads and different handles, none have been designed as a toothbrush with a novel decorative handle to be transformable into a jewelry piece or toy when no longer used as a toothbrush.

SUMMARY OF THE INVENTION

A toothbrush is used for the purpose of removing deposits of foreign matter from the surfaces of the teeth. The bristles of a toothbrush are known to have a limited life. After many uses, the bristles become fatigued and plastically deform. After the bristles plastically deform, they are not as effective for cleaning teeth. In addition to the bristles wearing out through plastic deformation, the life of a toothbrush is limited by the long-term build up of bacteria on the bristles.

Children dislike brushing their teeth. Because many children are too young to appreciate the hygienic value of brushing teeth, they need an incentive to regularly brush their teeth and wear out their toothbrushes. The present invention is directed to such an incentive, a thermoplastic toothbrush which can be transformed into a costume jewelry piece after it is no longer used as a toothbrush. The thermoplastic material and the transformation process is part of the fun for children in the making of the costume jewelry piece.

Plastics which may be repeatedly softened by heat and then hardened by cooling are termed thermoplastic materials. The thermoplastic materials of the present invention are easily shapable when heated by either hot water short of the boiling point or a hair dryer. Thermoplastic material is particularly useful for the present invention for at least three principal reasons: (1) it is desirable that the novelty toothbrush be easily hand-shapable by children; (2) it is desirable that the jewelry piece or toy be reshapable multiple times because this adds to the entertainment value of the novelty toothbrush; and (3) when bristles of the toothbrush are set in a thermoplastic head, the bristles may be easily removed by hand-pulling when the head of the toothbrush is heated.

A principal object of the invention is to provide a toothbrush which encourages children to brush their teeth.

Another object of the present invention is to provide a device which can serve as a toothbrush and later as a jewelry piece or toy.

Another object of the invention is to provide a toothbrush which may be easily transformed into a jewelry piece or toy after it is no longer employed in service as a toothbrush.

A further object of the invention is to provide a toothbrush for which the bristles may be easily removed when the bristles are heated.

Yet another object of the invention is to provide a toothbrush having a decorative handle which may be reshaped into a jewelry piece or toy numerous times.

A still further object of the invention is to provide a secondary use for used toothbrushes.

Still another object of the invention is to provide a costume jewelry piece that is formed from a thermoplastic toothbrush.

Another object of the invention is to provide a method to produce a costume jewelry piece or toy from a thermoplastic novelty toothbrush.

BRIEF DESCRIPTION OF THE DRAWINGS

FIG. 1 shows an elevation view of a novelty toothbrush of the present invention.

FIG. 2 shows a top view of a novelty toothbrush of the present invention.

FIG. 3 shows a top view of a novelty toothbrush of the present invention.

FIG. 4 shows a top view of a novelty toothbrush of the present invention.

FIG. 5 shows a perspective view of a costume jewelry piece or toy transformed from the novelty toothbrush of the present invention.

DETAILED DESCRIPTION OF THE PREFERRED EMBODIMENTS

Toothbrushes are used for the purpose of removing deposits of foreign matter from the surfaces of the teeth. Ordinary toothbrushes have bristles of substantially equal length and stiffness, standing straight up from a toothbrush head. During use, the bristles of a toothbrush are forced against the teeth and a toothbrush user moves a handle in side-to-side motions, circular motion, up-and-down motions, or some combination thereof. These motions imparted to the handle cause a similar motion of the bristles pressed against the teeth.

The bristles of a toothbrush are substantially resilient and, after a single use, return substantially to the position they were in before the single use. However, a toothbrush has a limited life. After many uses, the bristles become fatigued and plastically deform. Commonly, for a well-used toothbrush, the bristles splay outward. After the bristles plastically deform, they are not as effective for cleaning teeth. In addition to the bristles wearing out through plastic deformation, the life of a toothbrush is limited by the long-term build up of bacteria on the bristles.

Children dislike brushing their teeth. Because many children are too young to appreciate the hygienic value of brushing teeth, they need an incentive to regularly brush their teeth and wear out their toothbrushes. The present invention is directed to such an incentive, a thermoplastic toothbrush having a decorative handle which can be transformed into a costume jewelry piece after it is no longer used as a toothbrush. The thermoplastic material allows the children to have fun in the making of the costume jewelry piece.

Plastics which may be repeatedly softened by heat and then hardened by cooling are termed thermoplastic materials. Thermoplastics undergo no chemical change from heating. Thermoplastics are different from thermosetting plastics, which, when heated, undergo a chemical change and solidify or set so that they cannot be remelted. Thermoplastic materials are commonly used in injection molding processes. The thermoplastic materials of the present invention are easily shapable when heated by either hot water short of the boiling point or a hair dryer without burning the skin. Both thermoplastics and thermosetting plastics are often termed "thermoformable".

Thermoplastic material is particularly useful for the present invention for several reasons. First, it is desirable that the novelty toothbrush be easily hand-shapable by children, who are only capable of applying modest pressures by hand. The preferred heat source is hot water immersion short of the boiling point. Another heat source may be a hair dryer.

Secondly, it is desirable that the costume jewelry piece or toy may be reshapable multiple times because this adds to the entertainment value of the device. The shaping itself may be as much fun as wearing the costume jewelry piece.

Thirdly, when bristles of the toothbrush are set in a thermoplastic head, the bristles may be easily removed by hand-pulling when the head of the toothbrush is heated. Again, this is especially important for children who: (1) are only capable of exerting modest pulling forces on the bristles; (2) are prone to injury from sharp cutting instruments that may be otherwise used to remove the bristles and (3) should not deal with materials that can burn the skin.

In FIG. 1, a thermoplastic novelty toothbrush 10 has a handle 12, a head 14, resilient bristles 16, a first end 18, a second end 20, a middle portion 22, an upper surface 24, a lower surface 26, and an edge 28. The bristles 16 are set and embedded into bristle holes 17 in the head upper surface 30 when the novelty toothbrush 10 is molded during manufacturing. The bristles 16 are formed from a material common to other toothbrush bristles, such as nylon. The head 14 is located at the second end 20 of the toothbrush 10.

Still referring to FIG. 1, a user operates the novelty toothbrush 10 by first grasping handle 12. The user places toothpaste (not shown) on top of the bristles 16. The user then applies the bristles 16 to the teeth and moves the handle 12 in a circular motion, an up-and-down motion, a side-to-side-motion, or some combination thereof. The movement of the handle 12 imparts a similar translated motion in the head 14 and the bristles 16. The movement of the bristles 16 against the surfaces of the teeth removes or loosens food particles and plaque from the surfaces of the teeth. After the user has thoroughly brushed all the teeth surfaces, he or she rinses the mouth to remove all the food particles or plaque loosened by the brushing.

Again referring to FIG. 1, after a single brushing with toothbrush 10, the bristles 16 substantially return to their position before brushing. However, after multiple uses, the bristles 16 become mechanically fatigued and often splayed. Also, after multiple uses of the toothbrush 10, bacteria tends to accumulate and the toothbrush 10 needs to be replaced. For a conventional toothbrush, the user would discard the brush when its bristles were mechanically deformed or after the passage of time due to bacteria accumulation. For the toothbrush 10 of the present invention, the user transforms the toothbrush 10 into a jewelry piece, such as a bracelet, or toy when the toothbrush 10 would otherwise be discarded.

In FIG. 2, thermoplastic novelty toothbrush 10 has a handle 12, a head 14, resilient bristles 16, a first end 18, a second end 20, a middle portion 22, an upper surface 24, a bottom surface 26, and an edge 28. The bristles 16 are set or embedded into bristle holes 17 in the head upper surface 30 when the novelty toothbrush 10 is molded during manufacturing. The bristles 16 are formed from a material common to other toothbrush bristles, such as nylon. The handle 12 includes the first end 18 and the middle portion 22 of the toothbrush 10 having a distinctive novel shape. The head 14 is located at the second end 20 of the toothbrush 10.

For the particular embodiment shown in FIG. 2, the handle 12 is wavy-shaped. Diamond shapes 40 are molded into the handle upper surface 32. A rattle 42, resembling a rattle on a rattlesnake is located at the toothbrush first end 18. The wavy shape of handle 12, the diamonds 40 and the rattle 42 make the handle 12 into a general caricature of a rattlesnake.

In FIG. 3, thermoplastic novelty toothbrush 10 has a handle 12, a head 14, resilient bristles 16, a first end 18, a second end 20, a middle portion 22, an upper surface 24, a bottom surface 26, and an edge 28. The bristles 16 (not shown) are set into bristle holes 17 (not shown) in the head upper surface 30 when the novelty toothbrush 10 is molded during manufacturing. The bristles 16 are formed from a material common to other toothbrush bristles, such as nylon. The handle 12 is located at the toothbrush first end 18 and in the middle portion 22 of the toothbrush 10. The head 14 is located at the second end 20 of the toothbrush 10.

For the particular embodiment shown in FIG. 3, the handle lower surface 36 consists of four interconnected oval-shaped sections 50. Each oval-shaped section 50 has an upper surface eye 52 imprinted into the handle 12. An eyebrow 54 is embossed on the handle lower surface 36 above eye 52. On the handle upper surface 34 (not shown), eyes 56 align with lower surface eyes 52.

While FIGS. 2 and 3 indicate two handle designs, other distinctively shaped handles are possible within the scope of the invention.

FIG. 4 illustrates the process to transform a toothbrush with a decorative handle to a jewelry piece. A thermoplastic novelty toothbrush 10 has a handle 12, a head 14, bristle holes 17, a first end 18, a second end 20, a middle portion 22, an upper surface 24, a bottom surface 26, and an edge 28.

The transformation process will be performed after usage as a toothbrush. The bristles are removed by heating the head 14 in hot water and pulling the bristles 16 by hand, leaving the bristle holes 17 empty. The handle 12 is located at the first end 18 and in the middle portion 22 of the toothbrush 10. The head 14 is located at the second end 20 of the toothbrush 10.

FIG. 5 illustrates a further step in the process of the present invention. The thermoplastic novelty toothbrush 10 has a handle 12, a head 14, bristle holes 17, a first end 18, a second end 20, a middle portion 22, an upper surface 24, a bottom surface 26, and an edge 28. The bristles have been removed by heating the head 14 in hot water and pulling the bristles 16 by hand, leaving the bristle holes 17 empty. The handle 12 is located at the first end 18 and in the middle portion 22 of the toothbrush 10. The head 14 is located at the second end 20 of the toothbrush 10. The novelty toothbrush 10 has been heated by hot water immersion and then hand manipulated into the shape of a costume jewelry piece 60 or a toy. The costume jewelry piece 60 may be a bracelet, an arm band or an anklet, depending on the size of a wearer and the size of the costume jewelry piece 60. It may also be shaped into a toy in a chosen configuration.

The handle and head may alternatively be heated by hot air from a conventional hair dryer.

Finally, the jewelry piece will be allowed to cool to return to a rigid condition.

For all embodiments of the invention, before forming the toothbrush into a costume jewelry piece, the toothbrush may be thoroughly cleaned with a cleaner containing an antibacterial agent.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. A method for transforming a thermoplastic deformable toothbrush, having a handle and a head with bristles, into a costume jewelry piece or toy, comprising:

(a) heating the toothbrush with a hot air hair dryer to a thermoformable condition;

(b) pulling the bristles from the head of the heated toothbrush while the heated toothbrush is in the thermoformable condition;

(c) manipulating the heated toothbrush to reshape the heated toothbrush into the costume jewelry piece or toy while the heated toothbrush is in the thermoformable condition; and (d) allowing said costume jewelry piece or toy to cool to cause the costume jewelry piece or toy to return to a rigid condition.

2. A method for transforming a thermoplastic deformable toothbrush, having a decorative handle and a head with bristles, into a costume jewelry piece or toy, comprising the steps of:

(a) heating the toothbrush to a thermoformable condition by immersion in hot water at a temperature short of the boiling point;

(b) removing the heated toothbrush from said hot water while the heated toothbrush is in the thermoformable condition;

(c) pulling the bristles from the head of the heated toothbrush while the heated toothbrush is in the thermoformable condition;

(d) manipulating the heated toothbrush to reshape the heated toothbrush into the costume jewelry piece or toy while the heated toothbrush is in the thermoformable condition; and (e) allowing the costume jewelry piece or toy to cool to cause the costume jewelry piece or toy to return to a rigid condition.

3. A method for transforming as set forth in claim 2 wherein said heated toothbrush is manipulated to form a bracelet.

* * * * *